(12) United States Patent
Hama et al.

(10) Patent No.: US 6,946,770 B2
(45) Date of Patent: Sep. 20, 2005

(54) ELECTRIC MOTOR

(75) Inventors: Yohei Hama, Tochigi (JP); Akira Fujisaki, Tochigi (JP)

(73) Assignee: Showa Corporation, Saitama (JP)

( * ) Notice: Subject to any disclaimer, the term of this patent is extended or adjusted under 35 U.S.C. 154(b) by 105 days.

(21) Appl. No.: 10/655,932

(22) Filed: Sep. 5, 2003

(65) Prior Publication Data
US 2004/0189116 A1 Sep. 30, 2004

(30) Foreign Application Priority Data
Mar. 26, 2003 (JP) .................................. 2003-086483

(51) Int. Cl.[7] ............................................. J02K 13/00
(52) U.S. Cl. ...................................................... 310/249
(58) Field of Search ................ 310/239, 242, 310/249

(56) References Cited

U.S. PATENT DOCUMENTS

| | | | |
|---|---|---|---|
| 4,673,837 A | 6/1987 | Gingerich | 315/368.13 |
| 4,965,478 A * | 10/1990 | Kobayashi et al. | 310/249 |
| 5,436,519 A | 7/1995 | Morikawa | 310/217 |
| 5,889,345 A | 3/1999 | Iwata | 310/88 |
| 5,942,822 A | 8/1999 | Iwata | 310/70 |
| 6,429,553 B1 * | 8/2002 | Taniguchi et al. | 310/67 R |
| 6,664,699 B2 * | 12/2003 | Shioya et al. | 310/239 |

FOREIGN PATENT DOCUMENTS

| | | | |
|---|---|---|---|
| EP | 0733536 | 9/1996 | B62D/5/04 |
| FR | 2824199 | 10/2002 | H02K/5/14 |
| JP | 984300 | 3/1997 | |
| JP | 3207177 | 7/2001 | |

* cited by examiner

*Primary Examiner*—Darren Schuberg
*Assistant Examiner*—Judson H. Jones

(57) ABSTRACT

In an electric motor having a brush holding portion for holding a brush and a pigtail holding means for holding a pigtail connected to the brush, on a holder surface of a brush holder, the pigtail holding means holds the pigtail in both a lateral direction along the holder surface and a longitudinal direction crossing to the holder surface.

14 Claims, 10 Drawing Sheets

ELECTRIC MOTOR

BACKGROUND OF THE INVENTION

1. Field of the Invention

The present invention relates to an electric motor preferably used in a motor-driven power steering apparatus and the like.

2. Description of the Related Art

A motor-driven power steering apparatus for a vehicle is structured, as described in Japanese Patent Application Laid-Open No. H9-84300 (patent document 1), such that an assist shaft of a steering apparatus is connected to a rotation shaft of an electric motor. A rotation force of the electric motor is transmitted to the steering apparatus, thereby assisting a steering force applied to a steering shaft by a driver.

A conventional electric motor is structured, as described in Japanese Patent No. 3207177 (patent document 2), such that a brush is held to a brush holding portion provided on a holder surface of a brush holder. A pigtail connected to the brush is held to a pigtail holding portion provided on the holder surface of the brush holder. The pigtail is connected to a feed terminal.

In the prior art, the pigtail holding portion provided on the holder surface of the brush holder has a holding groove open to an upper side with respect to the holder surface, and only holds the pigtail from a lateral direction along the holder surface by inserting the pigtail to the holding groove. No disassembly prevention is provided in an opening of the holding groove. Accordingly, the pigtail is vibrated due to a vibration of the vehicle and the like, and motor performance such as a current ripple and the like is adversely affected.

SUMMARY OF THE INVENTION

An object of the present invention is to stably hold a pigtail connected to a brush on a holder surface of a brush holder in an electric motor.

The present invention relates to an electric motor having a brush holding portion for holding a brush and a pigtail holding means for holding a pigtail connected to the brush on a holder surface of a brush holder.

The pigtail holding means holds the pigtail in both a lateral direction along the holder surface and a longitudinal direction crossing to the holder surface.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A to 6C show a brush holder, in which FIG. 6A is a cross sectional view, FIG. 6B is a left side elevational view and FIG. 6C is a right side elevational view;

FIGS. 8A to 8C show a magnet holder, in which FIG. 8A is a cross sectional view, FIG. 8B is a cross sectional view along a line B—B in FIG. 8A and FIG. 8C is an end elevational view;

FIGS. 9A to 9C show a brush, in which FIG. 9A is a side elevational view, FIG. 9B is a plan view and FIG. 9C is a bottom elevational view of a main portion; and FIGS. 10A and 10B show an assembling state of a terminal, in which FIG. 10A is a schematic view showing a good assembly and FIG. 10B is a schematic view showing a faulty assembly.

DESCRIPTION OF THE PREFERRED EMBODIMENTS

Figure 1:
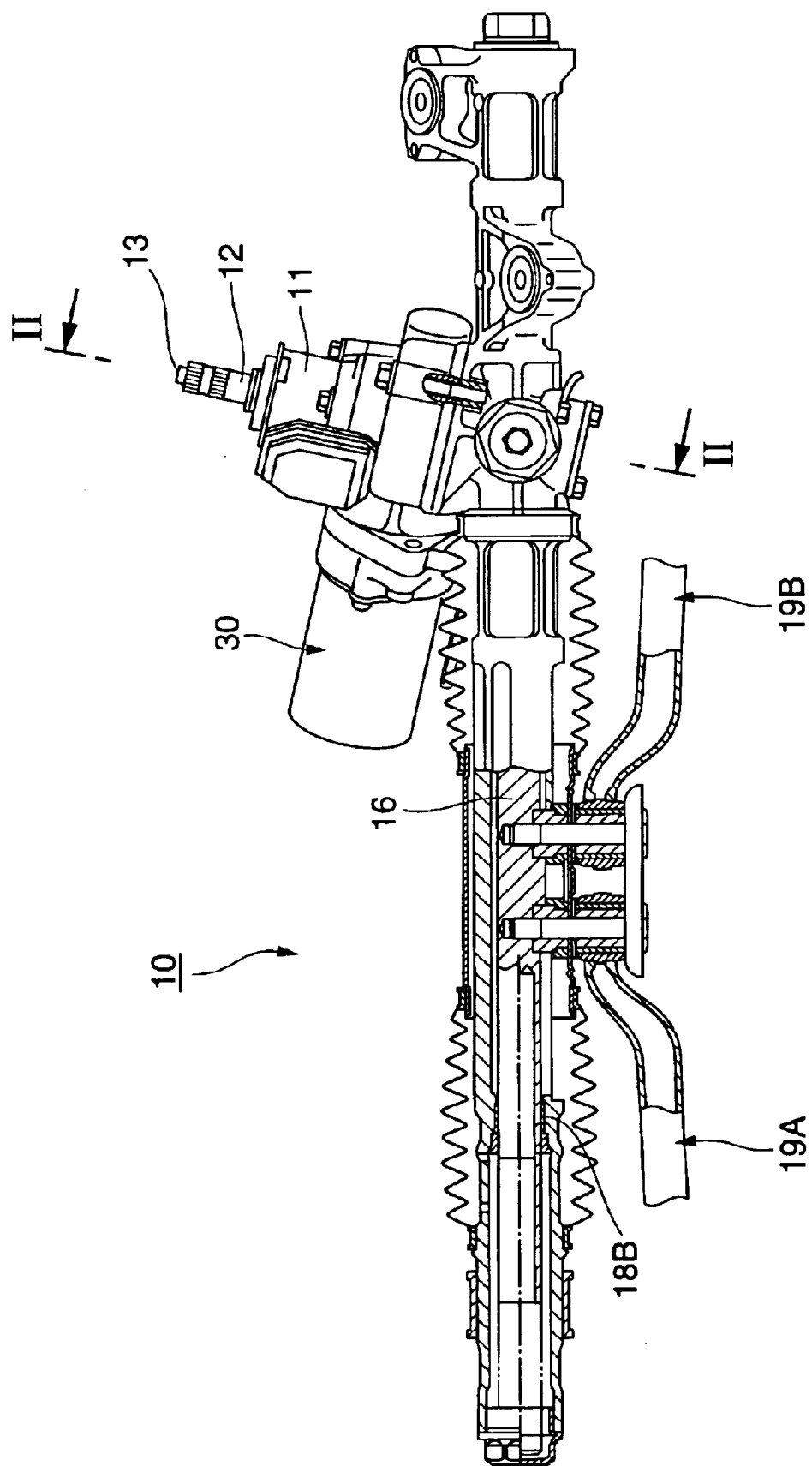
FIG. 1 is a front elevational view showing an electric power steering apparatus in a partly broken manner.
Figure 2:
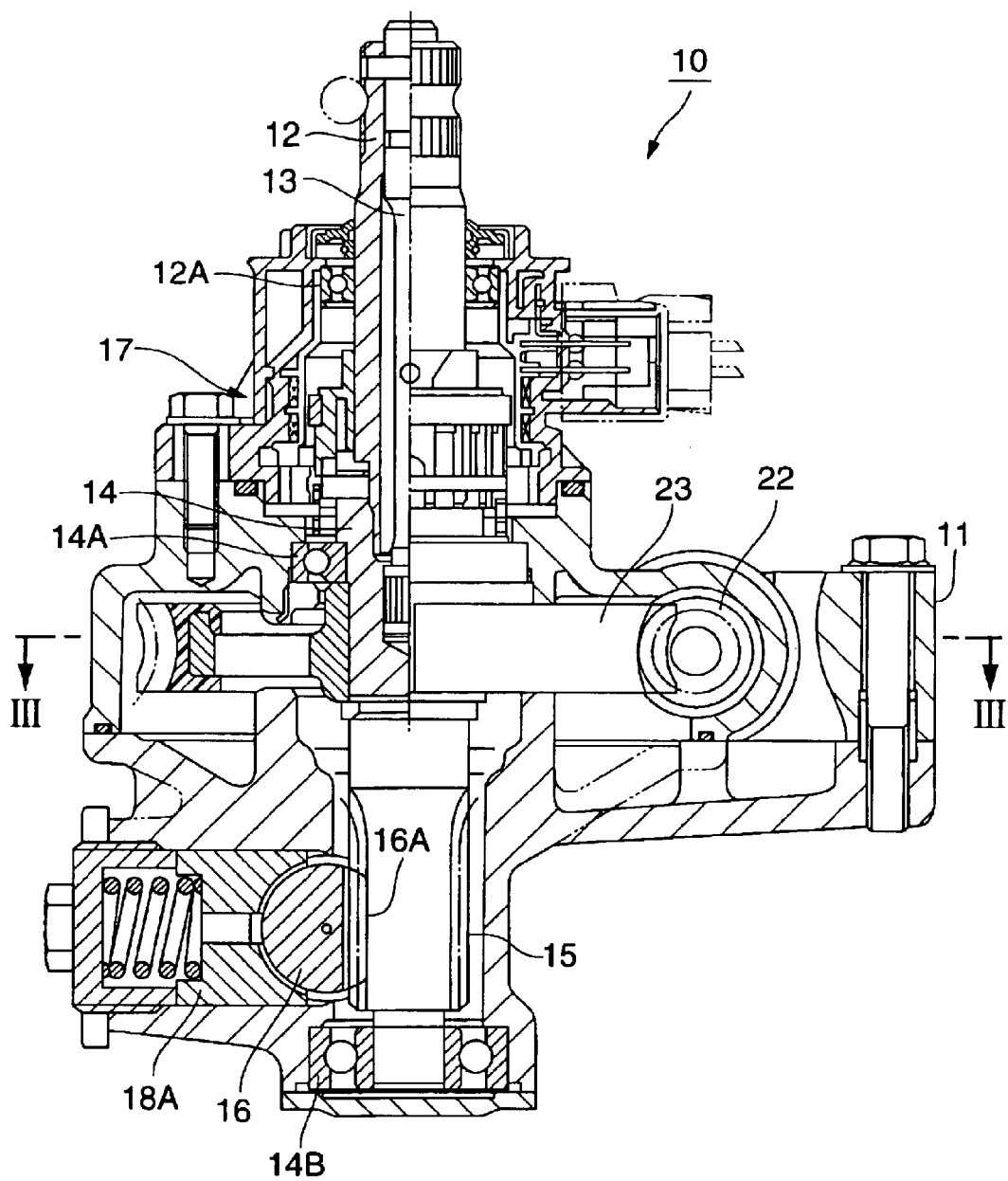
FIG. 2 is a cross sectional view along a line II—II in FIG. 1.

An electric power steering apparatus 10 has an aluminum alloy gear housing 11 fixed to a vehicle body frame, as shown in FIGS. 1 and 2. Further, a pinion shaft 14 is connected via a torsion bar 13 to a steering shaft 12 to which a steering wheel is connected. A pinion 15 is provided in the pinion shaft 14, and a rack shaft 16 provided with a rack 16A engaged with the pinion 15 is supported to the gear housing 11 so as to freely move right and left. A steering torque detection apparatus 17 is provided between the steering shaft 12 and the pinion shaft 14. In this case, the steering shaft 12 and the pinion shaft 14 are supported to the gear housing 11 via bearings 12A, 14A and 14B. The rack shaft 16 is slidably supported to a rack guide 18A at one end and to a bearing 18B at another end. Further, left and right tie rods 19A and 19B are connected to a middle portion of the rack shaft 16.

Figure 3:
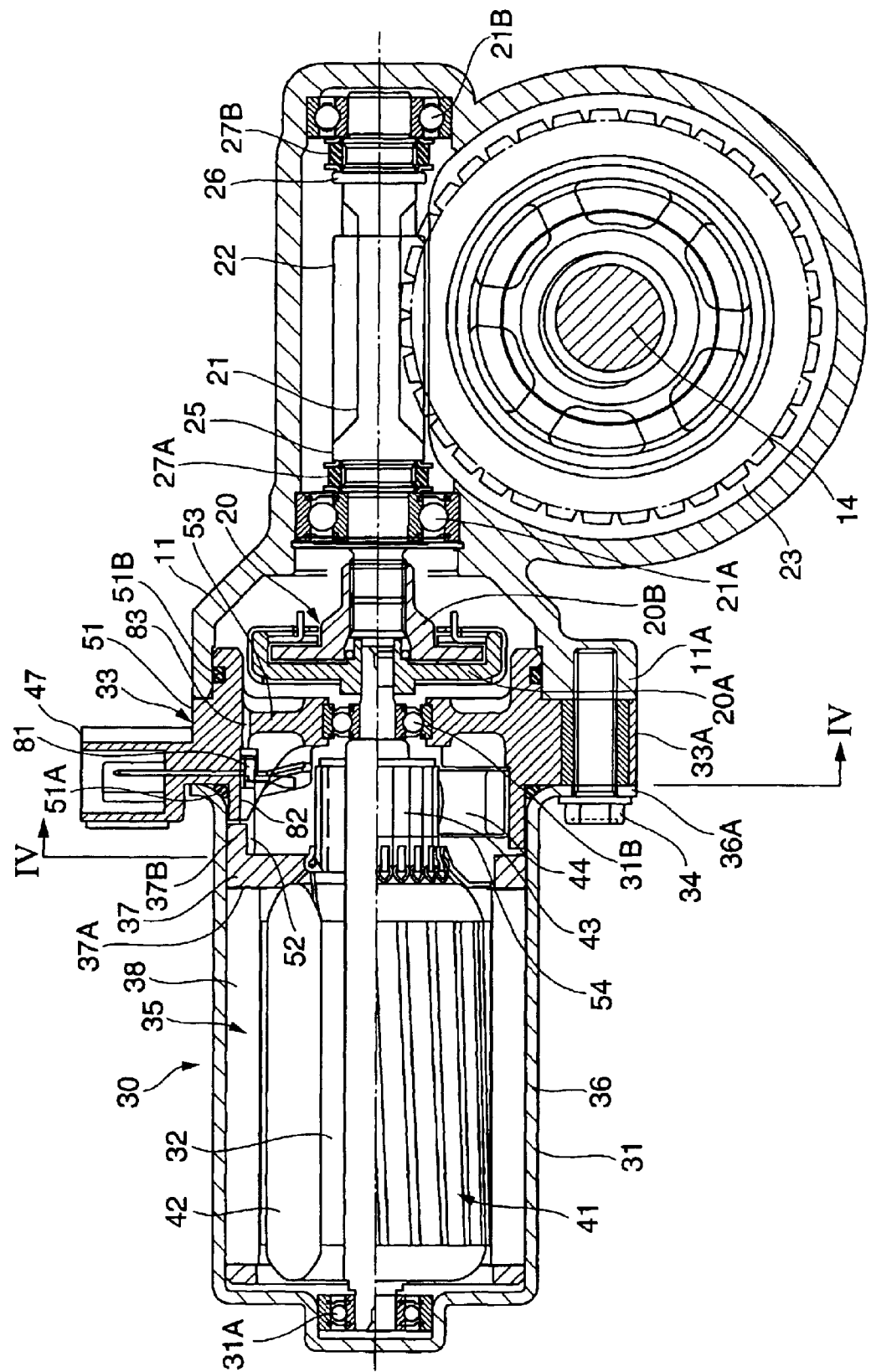
FIG. 3 is a cross sectional view along a line III—III in FIG. 2.

A motor case 31 of an electric motor 30 is fixed to the gear housing 11, as shown in FIG. 3. An assist shaft 21 is connected to a rotation shaft 32 of the electric motor 30 via a torque limiter 20, and the assist shaft 21 is supported to the gear housing 11 at both ends by bearings 21A and 21B such as a ball bearing or the like. A worm gear 22 is integrally provided in a middle portion of the assist shaft 21, and a worm wheel 23 engaged with the worm gear 22 is fixed to a middle portion of the pinion shaft 14. A torque generated in the electric motor 30 is applied as a steering assist force to the rack shaft 16 via engagement between the worm gear 22 and the worm wheel 23 and engagement between the pinion 15 and the rack 16A. Thereby assisting a steering force applied to the steering shaft 12 by a driver.

The torque limiter 20 is a friction plate type torque limiter including a connection body 20A connected to the rotation shaft 32 of the electric motor 30, and a connection body 20B connected to the assist shaft 21. In a normally used torque (a smaller torque than a limit torque) of the electric power steering apparatus 10, the rotation shaft 32 and the assist shaft 21 are continuously connected without slipping on the basis of a friction force of the torque limiter 20. In the case of an impact torque (equal to or larger than the limit torque) in which an inertia torque of the electric motor 30 overcomes the friction force of the torque limiter 20 when a stroke of the rack shaft 16 is suddenly stopped, due to running the tire onto the curb during steering, the rotation shaft 32 is designed to slip with respect to the assist shaft 21. Here, the torque limiter functions to prevent the torque of the electric motor 30 from being transmitted to a side of the assist shaft 21.

The assist shaft 21 is elastically supported to the housing 11 bidirectionally in an axial direction, and can absorb an excessive thrust applied to the assist shaft 21, such as when the electric power steering apparatus 10 is driven in reverse or the tire is run on a curb. In particular, outer rings of the bearings 21A and 21B for the assist shaft 21 are fixed to the gear housing 11, and the assist shaft 21 is loosely fitted to inner rings of the bearing 21A and 21B. Further, flanges 25 and 26 are provided in the assist shaft 21. A pre-compressed elastic deforming device 27A is interposed between the flange 25 and the inner ring of the bearing 21A, and a pre-compressed elastic deforming device 27B is interposed between the flange 26 and the inner ring of the bearing 21B. The elastic deforming devices 27A and 27B are assembled with a fixed pre-compressed amount (a fixed impact reducing performance) where the elastic deforming devices 27A and 27B are loaded in the assist shaft 21, thereby elastically supporting the assist shaft 21 bidirectionally in the axial direction.

In this case, the electric motor 30 is structured as follows.

Figure 4:
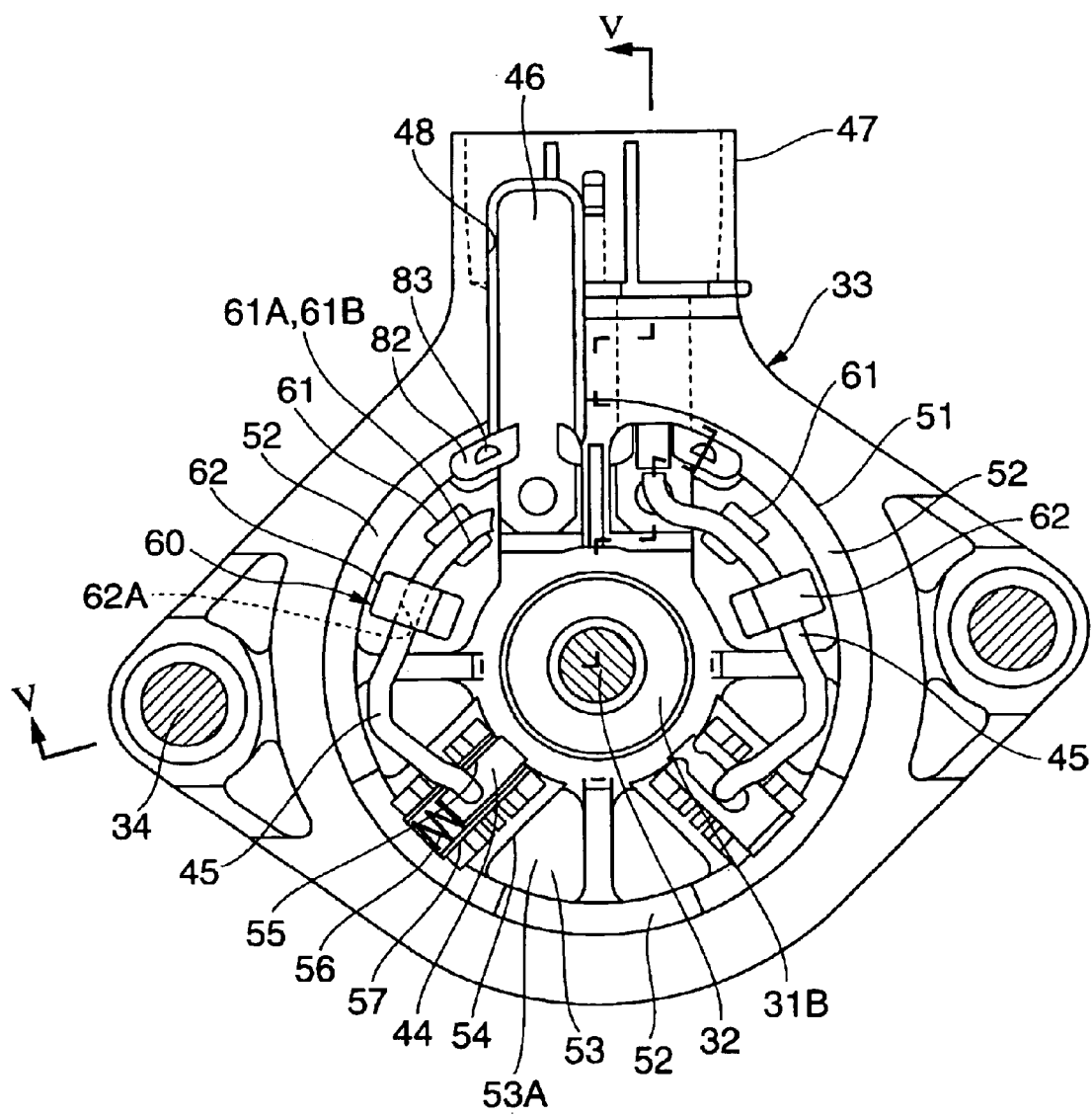
FIG. 4 is a view as seen from an arrow IV—IV in FIG. 3.
Figure 5:
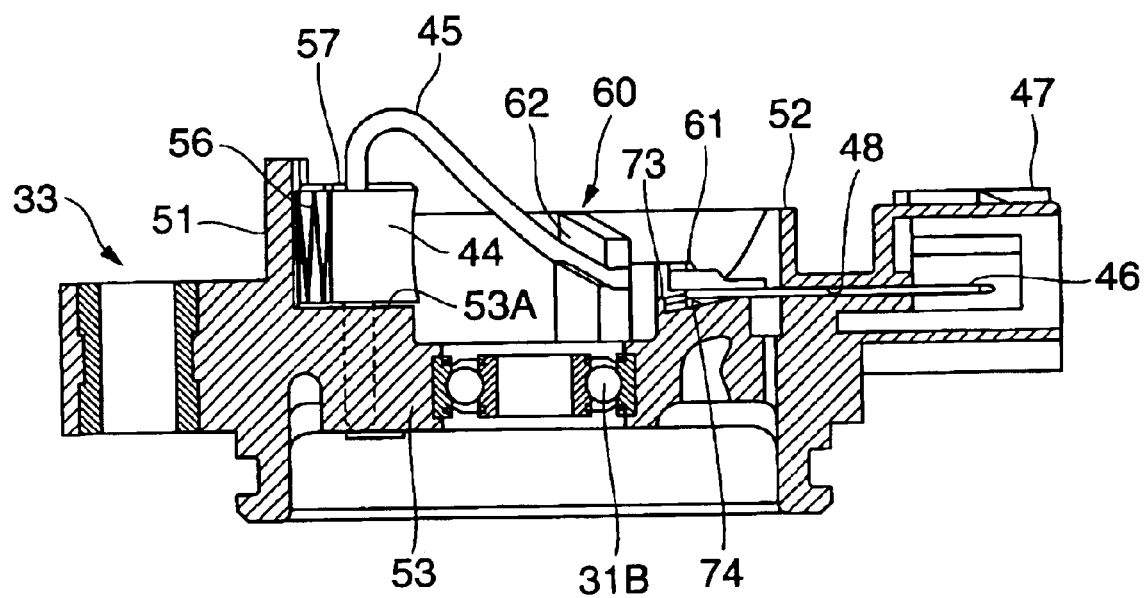
FIG. 5 is a cross sectional view along a line V—V in FIG. 4.
Figure 6:
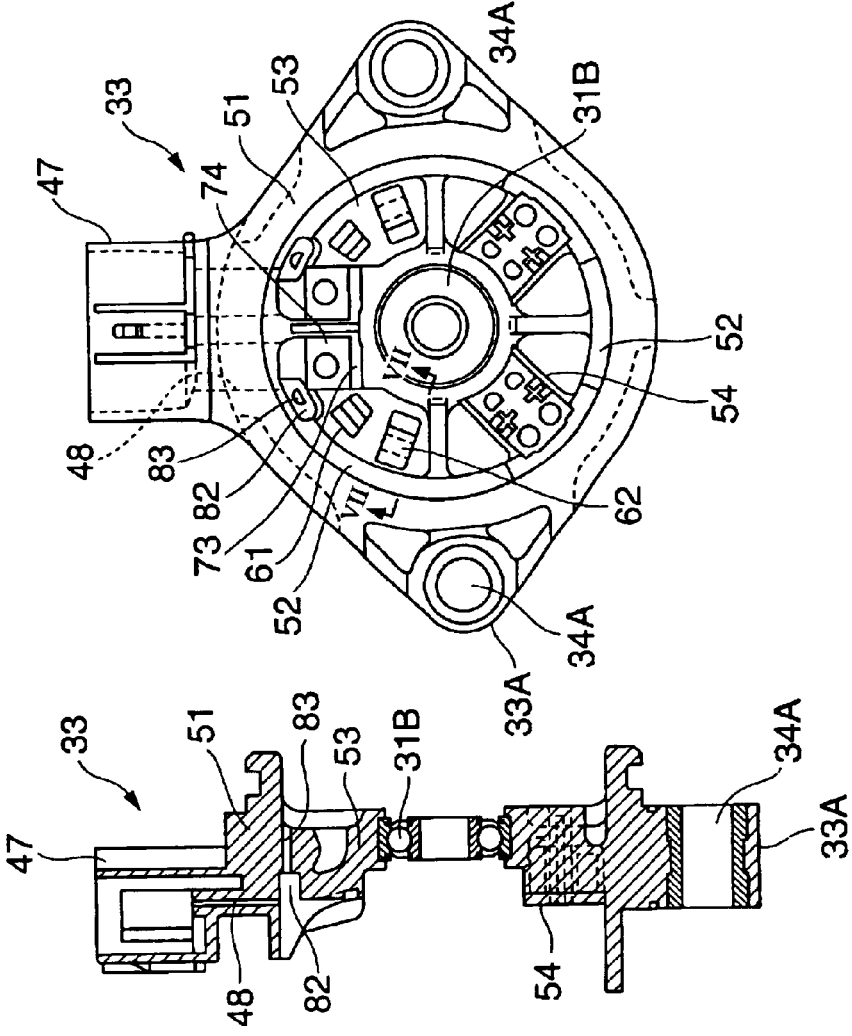

The electric motor 30 is structured, as shown in FIGS. 3 to 5, such that a motor case 31 and a brush holder 33 (FIGS. 6A to 6C, and FIG. 7) are fixed to the gear housing 11 by a bolt 34. The rotation shaft 32 is supported by bearings 31A and 31B comprising a ball bearing or the like respectively provided in the motor case 31 and the brush holder 33.

Further, the electric motor 30 has a stator 35. The stator 35 comprises a tubular yoke 36, a magnet holder 37 shown in FIGS. 8A to 8C, magnets 38, and, a magnet cover 39 (not shown). The tubular yoke 36 is made of a magnetic material, such as iron, forming a motor case 31. The magnet holder 37 comprises a tubular body formed by an insulating resin material which forms magnet receiving sections 37A in a plurality of positions in a peripheral direction of an inner periphery of the yoke 36. The magnets 38 are positioned and held by being received in the magnet receiving sections 37A of the magnet holder 37. The magnet cover 39 is formed by a non-magnetic ultrathin plate which is pressure-inserted into the inner sides of the magnets 38 positioned and held in the magnet holder 37.

The electric motor 30 has a rotor 41 which is inserted to an inner side of the stator 35 and is fixed to the rotation shaft 32. The rotor 41 is comprises an armature core 42 provided in an outer periphery of the rotation shaft 32 and a commutator 43.

The electric motor 30 has a brush 44 which is held by the brush holder 33, and is brought into contact with a commutator 43 of a rotor 41. The brush 44 is connected to one end of a pigtail, which may be a lead wire, 45. A terminal 46 is connected to another end of the pigtail 45, as shown FIGS. 9A to 9C. The brush holder 33 integrally has a feed connector 47, and is provided with a terminal insertion hole 48 in the feed connector 47. The terminal 46 mentioned above connected to the brush 44 is inserted into the terminal insertion hole 48 so as to be fixed.

The electric motor 30 is structured such that an opposing connector (not shown) is mounted to the feed connector 47. A feed terminal of the opposing connector is connected to the terminal 46 in a fitting state or the like, thereby feeding to the brush 44. In the electric motor 30, when the electric current is fed to the armature core 42 from the brush 44 via the commutator 43 of the rotor 41, a line of magnetic force of the armature core 42 shut off a magnetic field generated in the magnet 38 of the stator 35, whereby the rotor 41 is rotated.

Accordingly, the brush holder 33 is structured as shown in FIGS. 6A to 6C, and FIG. 7.

The brush holder 33 is an injection molded body integrally molded with the feed connector 47 and made of an insulative plastic material. The brush holder 33 is structured such that the yoke 36 (the motor case 31) is faucet connected to one end side of a short cylinder body 51 together with an O-ring 51A. The gear housing 11 is faucet connected to another end side of the short cylinder body 51 together with an O-ring 51B. The brush holder 33 is clamped between the yoke 36 and the gear housing 11, and can coaxially connect three elements comprising the yoke 36, the brush holder 33 and the gear housing 11 by the bolt 34.

In the brush holder 33, an engagement concave portion 52 is formed in a specified position in a peripheral direction, two positions in the present embodiment, in one end side of the short cylinder body 51. It is possible to prevent the brush 44 held by the brush holder 33 from being displaced from the magnet 38 of the stator 35, positioned by the magnet holder 37, by engaging a circular arch engagement convex portion 37B provided along an outer periphery on one end surface of the magnet holder 37 with the engagement concave portion 52. It is thereby possible to avoid rotation performance of the electric motor 30 from differing between the forward rotating direction and the backward rotating direction.

The brush holder 33 is provided with a partition wall 53 for partitioning the inner portion of the yoke 36 from the inner portion of the gear housing 11 in an inner portion of the short cylinder body 51, and is provided with the bearing 31B mentioned above comprising the ball bearing for the rotation shaft 32 in a center portion of the partition wall 53 in accordance with an integral insert molding.

The brush holder 33 is structured such that an end surface of the partition wall 53 facing the commutator 43 is set to a holder surface 53A. Brush holding portions 54 are provided in a plurality of positions, for example, two positions comprising right and left positions, in a peripheral direction on the holder surface 53A. A case body 57 in which through holes 55 for slidably inserting the right and left brushes 44 to the respective brush holding portions 54 are formed is assembled. The through hole 55 receives the brush 44 so as to slidably protrude to a side of the commutator 43, and holds the brush 44 in a positioned state. The brush holder 33 is additionally provided with a brush spring 56 which backup supports the brush 44 inserted to the through hole 55 and makes the brush 44 protrude from a leading end opening of the through hole 55 so as to push the brush 44 into contact with the commutator 43. In this case, FIG. 4 shows an assembled state in which the brush 44 and the brush spring 56 are assembled in one brush holding portion 54 of two brush holding portions 54. Only the brush 44 is assembled in the other one brush holding portion 54.

A description will be given below of (A) holding structure of the pigtail 45 and (B) placing structure of the terminal 46 in the electric motor 30.

(A) Holding structure of pigtail 45 in electric motor 30 (FIGS. 4 to 7)

The electric motor 30 has pigtail holding means 60 for holding the pigtails 45 connected to the brushes 44, in a plurality of positions, for example, two right and left positions corresponding to two right and left pigtails 45 respectively connected to right and left brushes 44 in the peripheral direction on the holder surface 53A formed by the partition wall 53 of the brush holder 33, as shown in FIGS. 4 to 6C. The pigtail holding means 60 holds the pigtail 45 in both a lateral direction, being a horizontal direction, along the holder surface 53A, and a longitudinal direction, being a vertical direction, orthogonal to the holder surface 53A.

The pigtail holding means 60 has a lateral direction pigtail holding portion 61 for holding an intermediate portion of the pigtail 45 in the lateral direction along the holder surface 53A, and a longitudinal direction pigtail holding portion 62 for holding the intermediate portion of the pigtail 45 in the longitudinal direction orthogonal to the holder surface 53A. The pigtail holding portion 61 and the pigtail holding portion 62 are arranged close to each other.

The lateral direction pigtail holding portion 61 has a concave holding groove 61A allowing insertion of the pigtail 45, and is provided with a disassembly prevention portion 61B for the pigtail 45 in an upward opening of the holding groove 61A. The disassembly prevention portion 61B is provided in both side portions of the opening in the holding groove 61A so as to protrude in a round shape, and make the opening of the holding groove 61A narrow.

Figure 7:
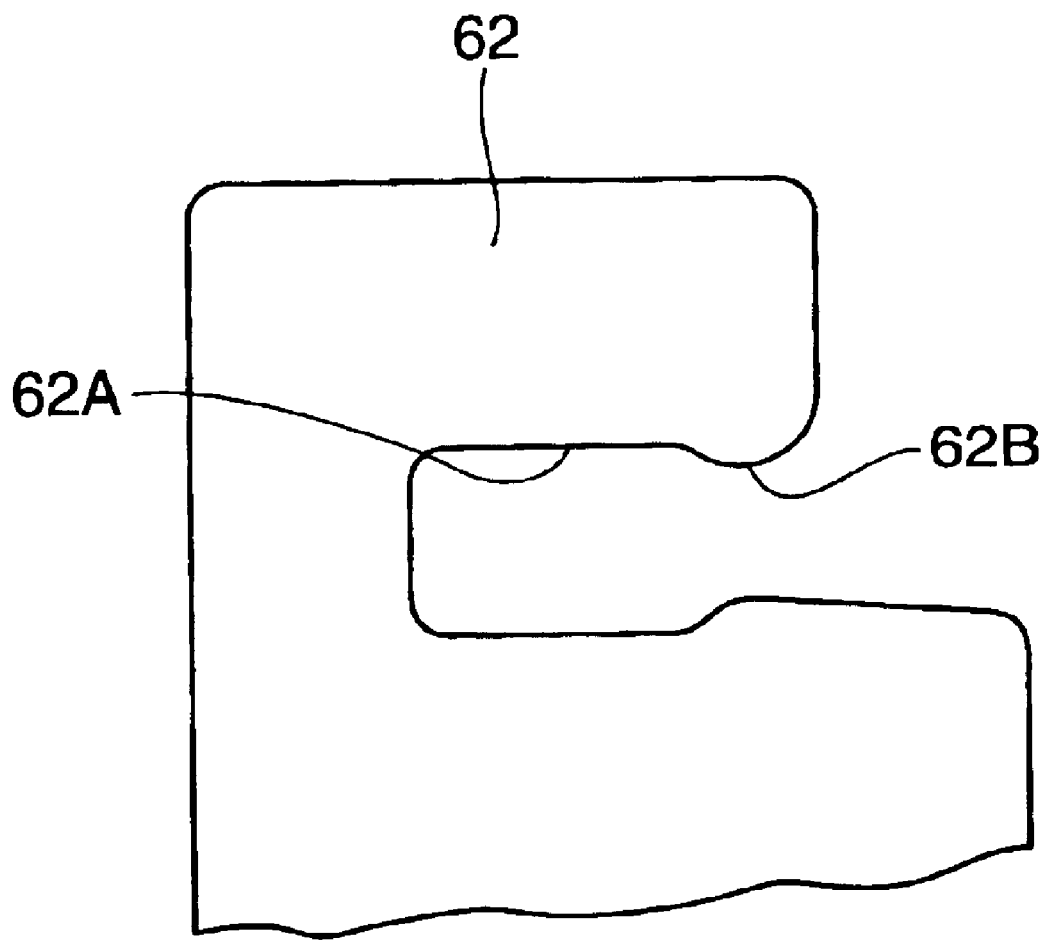
FIG. 7 is a view along a line VII—VII in FIG. 6B.

The longitudinal direction pigtail holding portion 62 has a concave holding groove 62A allowing insertion of the pigtail 45, as shown in FIG. 7, and is provided with a disassembly prevention portion 62B for the pigtail 45 in a transverse opening (an opening facing to a center axis of the brush holder 33) of the holding groove 62A. The disassembly prevention portion 62B is provided in both side portions of the opening in the holding groove 62A so as to protrude in a round shape, and make the opening of the holding groove 62A narrow.

In accordance with the present embodiment, since the holding structure of the pigtail 45 is provided in the electric motor 30, the following operations and effects can be achieved.

(1) In the electric motor 30, the pigtail holding means 60 provided on the holder surface 53A of the brush holder 33 holds the pigtail 45 in both the lateral direction along the holder surface 53A and the longitudinal direction orthogonal to the holder surface 53A. Accordingly, the pigtail 45 is held in the horizontal and vertical directions and is not vibrated by the vibration of the vehicle. As a result, motor performance such as current ripple or the like is not adversely affected.

(2) The pigtail holding means 60 has a lateral direction pigtail holding portion 61 and a longitudinal direction pigtail holding portion 62. Accordingly, it is possible to securely hold the pigtail 45 in the horizontal and vertical directions respectively by the lateral direction pigtail holding portion 61 and the longitudinal direction pigtail holding portion 62.

(3) Since the pigtail holding portions 61 and 62 are provided with the disassembly prevention portions 61B and 62B in the openings of the holding grooves 61A and 62A, allowing insertion of the pigtails 45, it is possible to stably hold the pigtails 45 in the inner portions of the holding grooves 61A and 62A.

(4) In the electric motor 30 of the motor-driven power steering apparatus 10, the above objects (1) to (3) can be achieved.

(B) Placing structure of terminal 46 in electric motor 30 (FIGS. 3 to 6C and 8A to 10B)

Figure 9A:
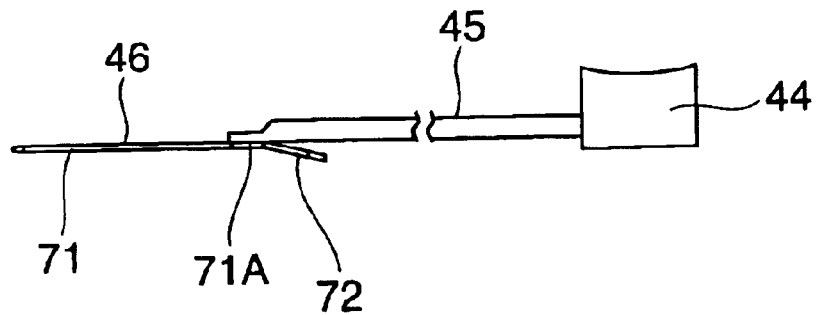
Figure 9B:
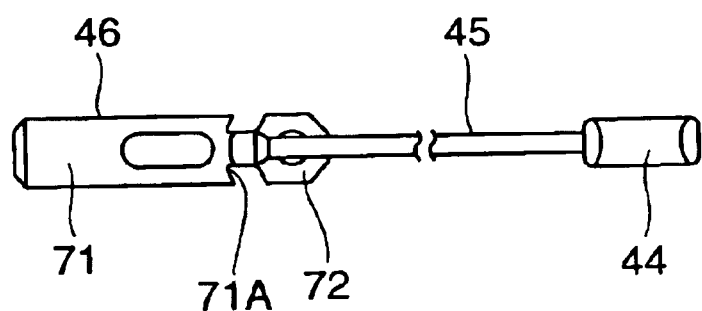
Figure 9C:
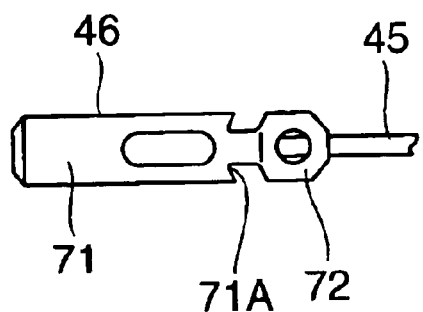

The electric motor 30 is provided with an engagement portion formed in a notch shape or a hole shape in the terminal 46. In the present embodiment, as shown in FIGS. 9A to 9C, concave engagement portions 71A are notched in both side portions of a main body portion 71 close to a base end side of the terminal 46 to which the pigtail 45 is connected.

In this case, the terminal 46 is formed in a flat plate shape as a whole. A base end portion 72 to which the pigtail 45 is connected is formed as a bent base end portion 72 obliquely crossing to the main body portion 71. When completely inserting the main body portion 71 of the terminal 46 to a terminal insertion hole 48 provided in a feed connector 47 integrally formed with the brush holder 33, the bent base end portion 72 overcomes an upper surface of a rising wall 73 formed in a rear side of the terminal insertion hole 48 on the holder surface 53A of the brush holder 33 due to elastic deformation. The bent base end portion 72 is provided on a downward slope surface 74 formed in a front side of the rising wall 73; a side close to the terminal insertion hole 48. The downward slope surface 74 is forming a downward slope toward a side of the rising wall 73. The bent base end portion 72 of the terminal 46 inserted to the terminal insertion hole 48 is brought into contact and aligned with the rising wall 73 so as to be prevented from coming off, as shown in FIGS. 4 and 5.

Figure 8A:
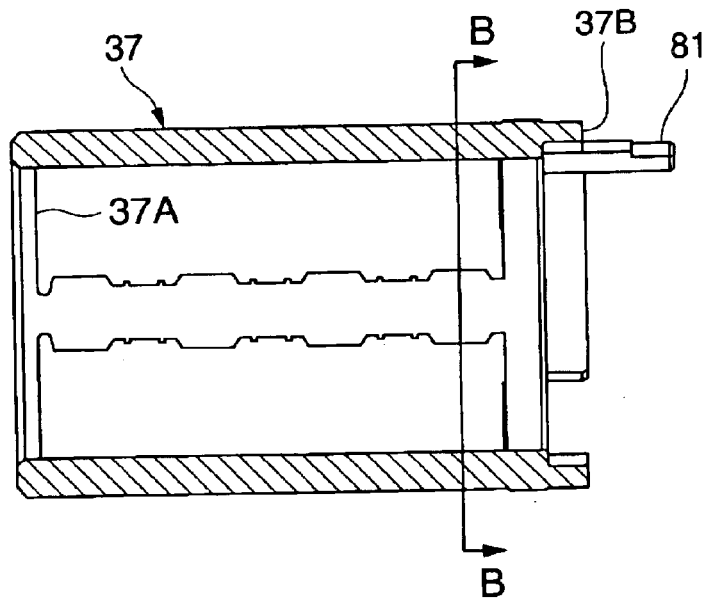
Figure 8B:
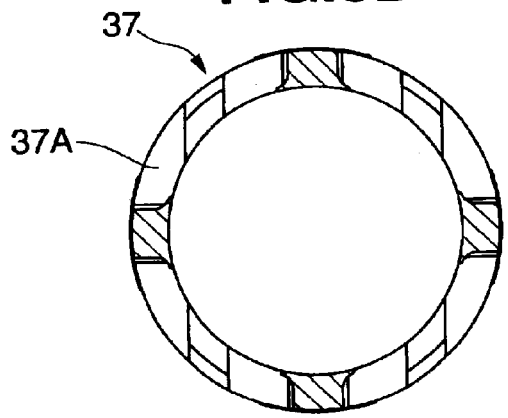
Figure 8C:
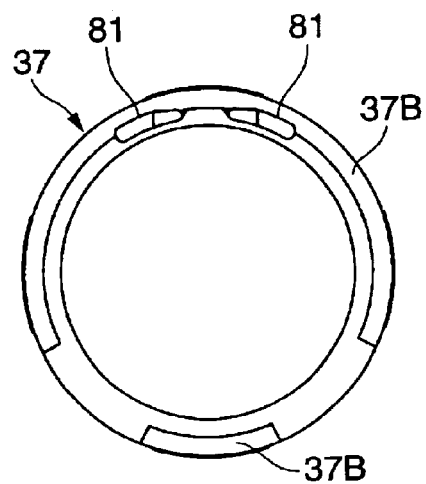

The electric motor 30 is provided with convex portions 81 on an end surface of the magnet holder 37 provided in the inner periphery of the yoke 36, as shown in FIGS. 8A to 8C. The convex portions 81 are provided in a protruding manner at a plurality of positions (two positions in the present embodiment) along the inner periphery of a circular arc engagement convex portion 37B of the magnet holder 37, as shown in FIGS. 8A to 8C. The electric motor 30 is structured, as shown in FIGS. 3 to 6C, as follows. The yoke 36 (the magnet holder 37) and the brush holder 33 are connected together with the gear housing 11 by the bolt 34 in the manner mentioned above. (a) The convex portion 81 mentioned above of the magnet holder 37 is aligned with the concave engagement portion 71A of the terminal 46 completely inserted to the terminal insertion hole 48 of the feed connector 47 integrally formed with the brush holder 33 in the manner mentioned above. (b) Recess portions 82 are provided in positions corresponding to the concave engagement portion 71A of the terminal 46 and the convex portion 81 of the magnet holder 37. The recess portions 82 are provided in the positions along an engagement recess portion 52 formed in a short cylinder body 51 of the brush holder 33. Accordingly, when connecting the yoke 36 (the magnet holder 37), the brush holder 33 and the gear housing 11 by the bolt 34, the convex portion 81 of the magnet holder 37 is engaged with and inserted to the concave engagement portion 71A of the terminal 46 (FIG. 10A), and is further inserted to the recess portion 82 of the brush holder 33 via the concave engagement portion 71A.

In this case, the motor-driven power steering apparatus 10 is provided with a through hole shaped communication passage 83 capable of ventilating between the inner portion of the yoke 36 and the inner portion of the gear housing 11, in an inner portion of the recess portion 82 mentioned above in the partition wall 53 of the brush holder 33, as shown in FIGS. 3, 4 and 6A to 6C. The opening facing to the side of the magnet holder 37 of the communication passage 83 is set as the recess portion 82 mentioned above. Here, the convex portion 81 of the magnet holder 37 is allowed to be inserted to the recess portion 82 via a narrow passage (not shown), and forms a shielding means for shielding foreign materials which are going to pass through the opening of the communication passage 83 (the recess portion 82).

In accordance with the present embodiment, since the placing structure of the terminal 46 in the electric motor 30 is provided in the manner mentioned above, the following operations and effects can be achieved.

Figure 10A:
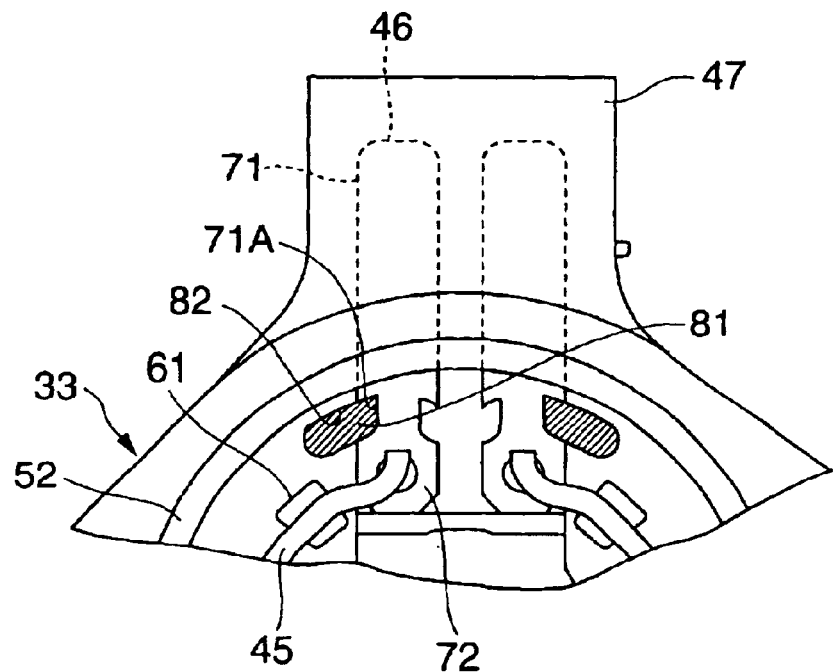

(1) In the electric motor 30, where the yoke 36 and the brush holder 33 are connected, as shown in FIG. 10A, the convex portion 81 of the magnet holder 37 is engaged with and inserted to the engagement portion 71A of the terminal 46 inserted to and previously assembled in the terminal insertion hole 48 provided in the feed connector 47 of the brush holder 33. Since the convex portion 81 of the magnet holder 37 is engaged with and inserted to the engagement portion 71A of the terminal 46 in a direction crossing to the inserting direction of the terminal 46 to the terminal insertion holder 48 (orthogonal direction in the present embodiment), it is possible to prevent the terminal 46 from coming off from the terminal insertion hole 48. Accordingly, when mounting the opposing connector to the feed connector 47, the terminal 46 is not pushed out by the feed terminal of the opposing connector so as to be prevented from coming off from the terminal insertion hole 48, and the feed terminal and the terminal 46 are property connected.

Figure 10B:
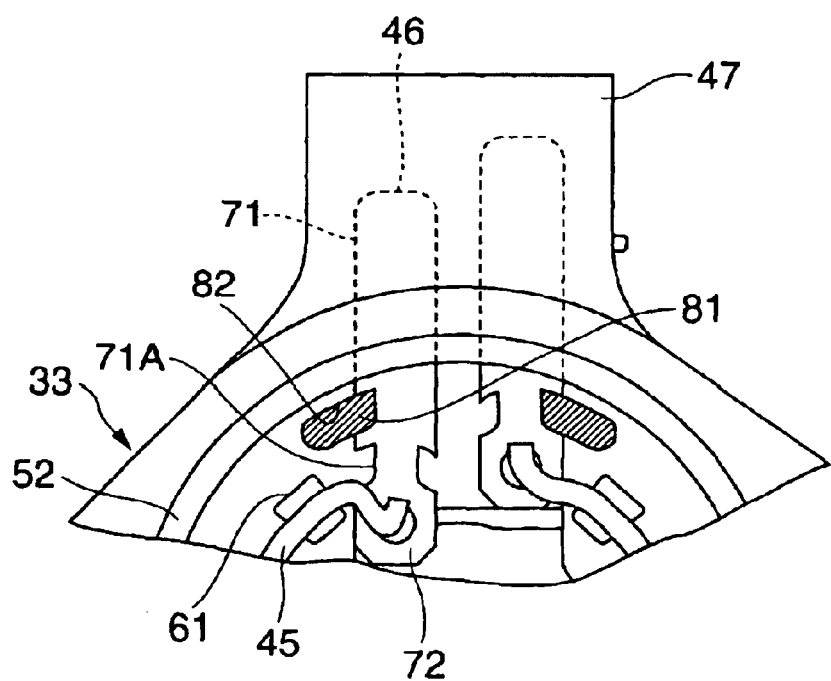

(2) In a faulty assembly state in which the terminal 46 is not completely inserted to the terminal insertion hole 48 of the feed connector 47, the convex portion 81 of the magnet holder 37 provided in the inner periphery of the yoke 36 does not correspond to the engagement portion 71A of the terminal 46 when connecting the yoke 36 to the brush holder 33. The convex portion 81 is brought into contact with the portions other than the engagement portion 71A of the terminal 46 so as to be interfered, as shown in FIG. 10B. Therefore, it is difficult or impossible to connect the yoke 36 to the brush holder 33, so that it is possible to find the faulty assembly of the terminal 46.

(3) The convex portion 81 of the magnet holder 37 is inserted into the recess portion 82 of the brush holder 33 via the engagement portion 71A of the terminal 46. Accordingly, when the convex portion 81 of the magnet holder 37 can not be inserted into the recess portion 82 of the brush holder 33 when assembling the yoke 36 and the brush holder 33, it is possible to find a defect in an assembled position between the brush holder 33 and the magnet holder 37 in the peripheral direction. Therefore, it is possible to prevent the brush 44 held by the brush holder 33 from being displaced from the magnet 38 of the stator 35 positioned by the magnet holder 37. It is also possible to prevent the rotation performance of the electric motor 30 from differing between the forward rotation direction and the reverse rotation direction.

(4) Since the brush holder 33 has the communication passage 83 extending through the partition wall 53, it is possible to allow breathing between the inner portion of the yoke 36 and the inner portion of the gear housing 11 by the communication passage 83 when the interior air temperature of the yoke 36 is changed. This allows expansion and contraction in correspondence with the heating/cooling of the electric motor 30 on the basis of the operation of the motor-driven power steering apparatus 10. It is thereby possible to prevent dew condensation or the like from being generated in the inner portion of the yoke 36.

(5) The convex portion 81 of the magnet holder 37 is inserted into the recess portion 82 formed by the opening facing the inner portion of the yoke 36 in the communication passage 83 provided in the brush holder 33, via the narrow passage. The inner and outer sides of the yoke 36 are communicated by the bent passage. Accordingly, the convex portion 81 of the magnet holder 37 can prevent foreign materials from passing without preventing the venting of air breathing between the inner portion of the yoke 36 and the inner portion of the gear housing 11.

(6) If grease applied to the periphery of the assist shaft 21 in the inner portion of the gear housing 11 is scattered when operating the motor-driven power steering apparatus 10 in which the electric motor 30 is assembled in the gear housing 11, it is possible to prevent grease from intruding into the inner portion of the yoke 36 of the electric motor 30 from the communication passage 83 as a result of the existence of the convex portion 81.

(7) In the preliminary step toward the step that the electric motor 30 is assembled in the gear housing 11, it is possible to prevent dust in the ambient air from intruding into the inner portion of the yoke 36 in the electric motor 30 from the communication passage 83 as a result of the convex portion 81.

(8) In the electric motor 30 of the motor-driven power steering apparatus 10, it is possible to achieve the above objects (1) to (7).

In accordance with the present invention, in the electric motor, it is possible to stably hold the pigtail connected to the brush on the holder surface of the brush holder.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An electric motor, having a brush holding portion for holding a brush and a pigtail holding means for holding a pigtail connected to the brush, on a holder surface of a brush holder, wherein the pigtail holding means is arranged and constructed to hold the pigtail in both a lateral direction along the holder surface and a longitudinal direction crossing to the holder surface;

the pigtail holding means has a lateral direction pigtail holding portion arranged and constructed to hold the pigtail in a lateral direction along the holder surface, and a longitudinal direction pigtail holding portion arranged and constructed to hold the pigtail in a longitudinal direction crossing to the holder surface; and the pigtail holding portion has a holding groove allowing insertion of the pigtail, and a disassembly prevention portion for the pigtail being provided in an opening of the holding groove.

2. An electric motor as claimed in claim 1, wherein the lateral direction pigtail holding portion and the longitudinal direction pigtail holding portion are arranged close to each other.

3. An electric motor as claimed in claim 1, wherein the pigtail holding portion is a lateral direction pigtail holding portion, the lateral direction pigtail holding portion having a concave holding groove allowing insertion of the pigtail, and a disassembly prevention portion for the pigtail being provided in an upward opening of the holding groove.

4. An electric motor as claimed in claim 1, wherein the pigtail holding portion is a longitudinal direction pigtail holding portion, the longitudinal direction pigtail holding portion has a concave holding groove allowing insertion of the pigtail, and a disassembly prevention portion for the pigtail being provided in a lateral opening facing to a side of a center shaft of the brush holder in the holding groove.

5. An electric motor as claimed in claim 1, wherein the disassembly prevention portion is provided in both side portions of the opening of the holding groove so as to protrude in a round shape, thereby resulting in a structure where the opening of the holding groove is narrow.

6. An electric motor as claimed in claim 3, wherein the disassembly prevention portion is provided in both side portions of the opening of the holding groove so as to protrude in a round shape, thereby resulting in a structure where the opening of the holding groove is narrow.

7. An electric motor as claimed in claim 4, wherein the disassembly prevention portion is provided in both side portions of the opening of the holding groove so as to protrude in a round shape, thereby resulting in a structure where the opening of the holding groove is narrow.

8. A motor-driven power steering apparatus comprising the electric motor as claimed in claim 2.

9. A motor-driven power steering apparatus comprising the electric motor as claimed in claim 1.

10. A motor-driven power steering apparatus comprising the electric motor as claimed in claim 3.

11. A motor-driven power steering apparatus comprising the electric motor as claimed in claim 4.

12. A motor-driven power steering apparatus comprising the electric motor as claimed in claim 5.

13. A motor-driven power steering apparatus comprising the electric motor as claimed in claim 6.

14. A motor-driven power steering apparatus comprising the electric motor as claimed in claim 7.

* * * * *